(12) United States Patent
Ergen et al.

(10) Patent No.: US 8,265,627 B2
(45) Date of Patent: Sep. 11, 2012

(54) METHOD AND APPARATUS FOR HANDOVER IN WIRELESS COMMUNICATION NETWORK

(75) Inventors: Mustafa Ergen, Oakland, CA (US);
Rehan Jalil, San Jose, CA (US); Tony Mak, San Francisco, CA (US)

(73) Assignee: WiChorus, Inc., Santa Clara, CA (US)

( * ) Notice: Subject to any disclaimer, the term of this patent is extended or adjusted under 35 U.S.C. 154(b) by 421 days.

(21) Appl. No.: 12/274,371

(22) Filed: Nov. 20, 2008

(65) Prior Publication Data
US 2010/0124928 A1 May 20, 2010

(51) Int. Cl.
*H04W 36/00* (2009.01)
(52) U.S. Cl. .......................................... 455/436
(58) Field of Classification Search .................... 455/436
See application file for complete search history.

(56) References Cited

U.S. PATENT DOCUMENTS 7,676,226 B2 * 3/2010 Han et al. ...................... 455/436

* cited by examiner

*Primary Examiner* — Charles Shedrick
(74) *Attorney, Agent, or Firm* — Hamilton, Brook, Smith & Reynolds, P.C.

(57) ABSTRACT

A method and apparatus for handover of a MS of a plurality of MSs to a BS of a plurality of BSs in a wireless communication network. The method includes identifying a target BS from the plurality of BSs for handover of the MS served by a serving BS. A difference between a quality of a signal received by the MS from the target BS and the quality of the signal received by the MS from the serving BS is greater than or equal to a first predefined threshold. The method further includes performing a handover for the MS from the serving BS to the target BS when the quality of the signal received by the MS from the serving BS is greater than or equal to a second predefined threshold.

19 Claims, 5 Drawing Sheets

METHOD AND APPARATUS FOR HANDOVER IN WIRELESS COMMUNICATION NETWORK

FIELD OF THE INVENTION

The invention generally relates to a wireless communication network. More specifically, the invention relates to method and apparatus for handover in a wireless communication network.

BACKGROUND OF THE INVENTION

A wireless communication network typically includes a plurality of gateways such as, an Access Service Network (ASN)-Gateway. Each gateway of the plurality of gateways communicates with a plurality of Base Stations (BSs) for transferring data packets, such as, Internet Protocol (IP) packets. Further, each BS of the plurality of BSs communicates with one or more Mobile Stations (MSs).

In the wireless communication network, a MS communicating with a serving BS may frequently lose a communication link with the serving BS. This may happen when a quality of a signal received by the MS from the serving BS deteriorates. To provide continuing service to a user of the MS, a new communication link may be required before the communication link with the serving BS is lost. Therefore, the MS is handed over to another BS of the plurality of BSs.

Typically, the MS is handed over to another BS whenever the quality of the signal received from the serving BS falls below a threshold value. This may lead to a situation where the MS is frequently handed over to multiple BSs that provide a signal having a quality marginally above the quality of the signal received from the serving BS. This may lead to unnecessary computation load on the wireless communication network to manage frequent handovers of the MS.

Therefore, there is a need of a method and apparatus to reduce frequent handovers of a MS.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
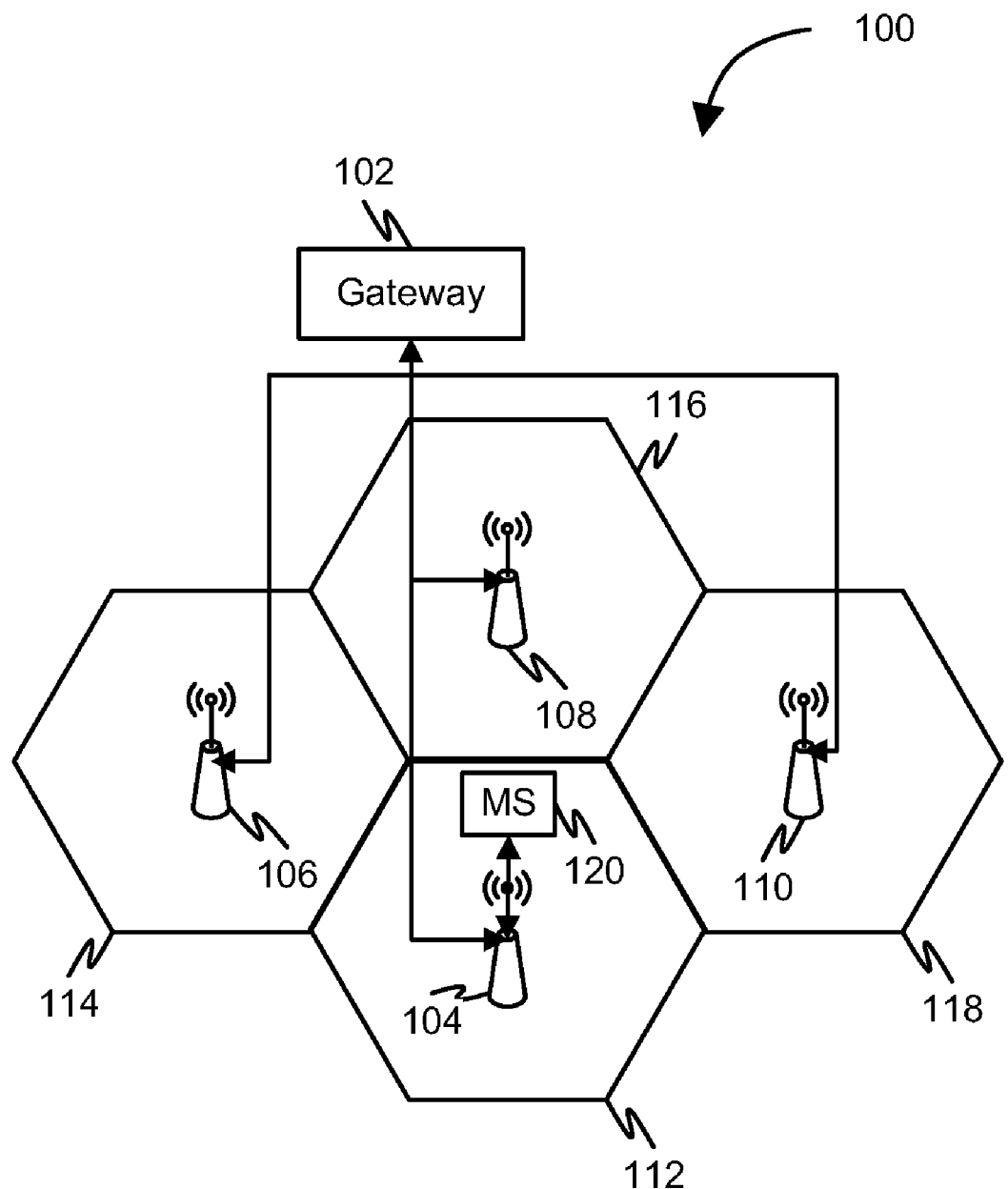
FIG. 1 illustrates a block diagram of a wireless communication network in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to handover in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises", "comprising" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and apparatuses for handover for a MS in a wireless communication network. The method includes identifying a target BS from a plurality of BSs for handover of the MS served by a serving BS. A difference between a quality of a signal received by the MS from the target BS and a quality of a signal received by the MS from the serving BS is greater than or equal to a first predefined threshold. The method further includes performing a handover for the MS from the serving BS to the target BS when the quality of the signal received by the MS from the serving BS is greater than or equal to a second predefined threshold.

FIG. 1 illustrates a block diagram of a wireless communication network 100 in which various embodiments of the invention may function. Wireless communication network 100 is depicted as a cellular network. However, it will be apparent to a person skilled in the art that wireless communication network 100 may have any other structure know in the art. Examples of wireless communication network 100 may include, but are not limited to, a Wireless Interoperability Microwave Access (WiMAX) communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (Wi-Fi) network, and any variant of an Orthogonal Frequency Division Multiple Access (OFDMA) communication network.

Wireless communication network 100 includes a gateway 102 and a plurality of Base Station (BSs) such as, a BS 104, a BS 106, a BS 108, and a BS 110. In case, wireless communication network 100 is a WiMAX communication network, gateway 102 is an Access Service Network (ASN)-Gateway. It will be apparent to a person skilled in the art that wireless communication network 100 may include more than one gateway. Gateway 102 communicates with the plurality of BSs to perform various services in wireless communication network 100. Examples of the services may include, but are not limited to video distribution, vehicle tracking, e-learning, web browsing, and weather monitoring.

Each BS of the plurality of BSs has a corresponding cell. For example, BS 104 has a cell 112, BS 106 has a cell 114, BS 108 has a cell 116, and BS 110 has a cell 118. A BS of the plurality of BSs has one or more neighboring BSs, which are collocated with the BS. A cell of the BS and cells of the one or more neighboring BSs are adjacent. For example, cell 114 of BS 106 and cell 116 of BS 108 are adjacent to cell 112 of BS 104. Alternatively, the cell of the BS and the cells of the one or more neighboring BSs may have one or more overlapping regions (not shown in FIG. 1).

The plurality of BSs further communicates with one or more MSs to provide the various services in wireless communication network 100. For example, BS 104 communicates with a MS 120 in cell 112. Examples of a MS may include, but are not limited to a laptop, a Personal Digital Assistant (PDA), a mobile phone, and any hand-held devices.

Typically, a quality of a signal received by a MS from a serving BS of the plurality of BSs varies based on one or more factors. One of the one or more factors is distance of the MS from the serving BS. The quality of the signal is determined from one or more of a Received Signal Strength Indication (RSSI), a Signal to Noise Ratio (SNR), a Signal to Noise Interference Ratio (SNIR), and a Channel to Noise Interference Ratio (CNIR). For example, with increase in distance of MS 120 from BS 104, a quality of a signal received by MS 120 from BS 104 may gradually degrade. In such an instance, there may be a need to handover MS 120 to a neighboring BS of BS 104, i.e., one of BS 106, BS 108, and BS 110, to provide uninterrupted connectivity to MS 120.

Figure 2:
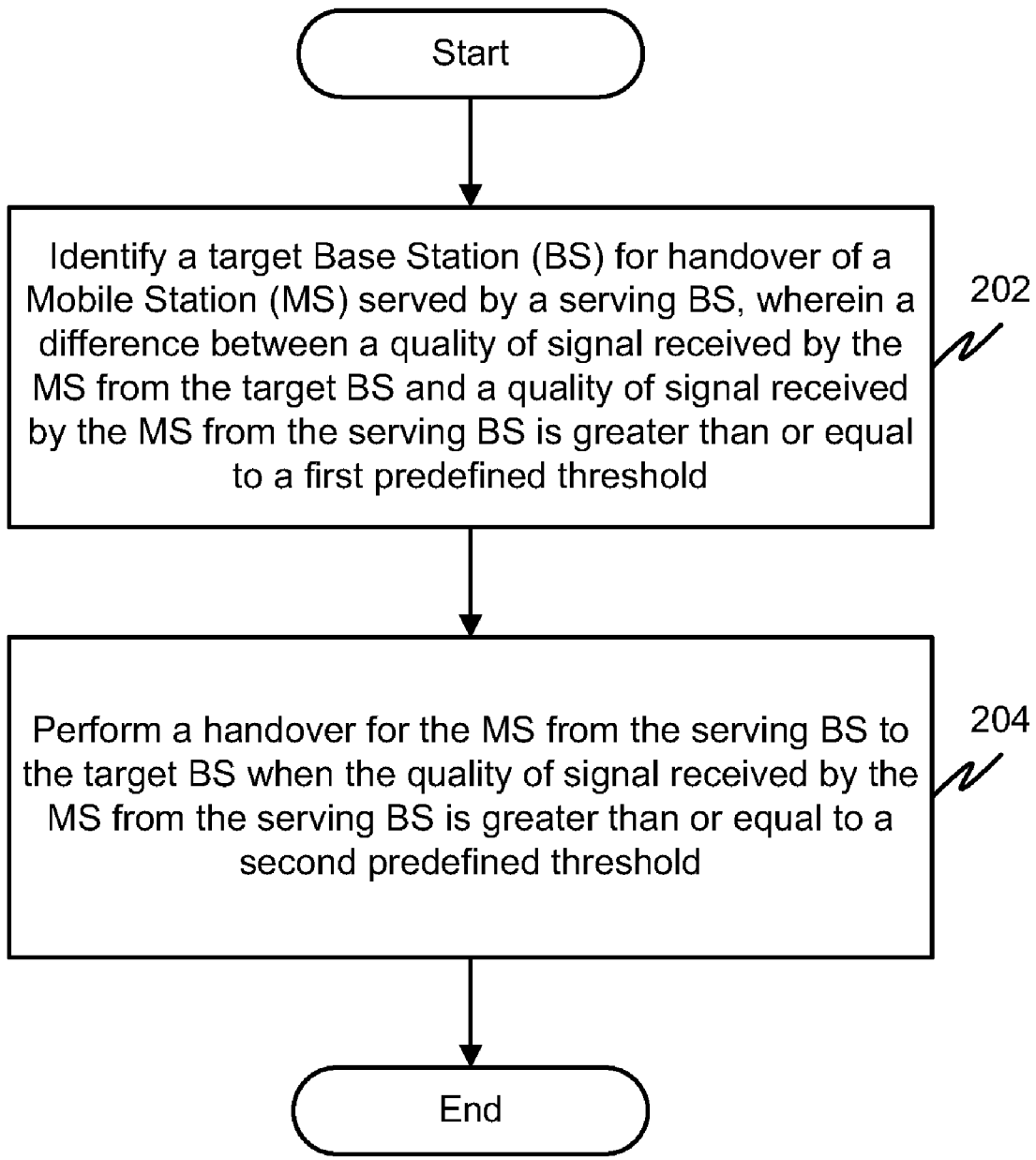
FIG. 2 illustrates a flow diagram of a method for performing a handover in a wireless communication network, in accordance with an embodiment of the invention.

FIG. 2 illustrates a flow diagram of a method for performing a handover in wireless communication network 100, in accordance with an embodiment of the invention. In wireless communication network, a MS served by a serving BS may frequently move away from the serving BS. In such a case, a quality of a signal received by the MS from the serving BS may degrade. To provide continued service to a user of the MS, at step 202, a target BS is identified from a plurality of BSs for handover of the MS. The target BS is a neighboring BS collocated with the serving BS. A cell of the target BS may be adjacent to a cell of the serving BS. Alternatively, one or more portions of the cell of the target BS may overlap with the cell of the serving BS.

A quality of a signal received by the MS from the target BS is greater than a quality of a signal received by the MS from the serving BS. Additionally, a difference between the quality of the signal received by the MS from the target BS and the quality of the signal received by the MS from the serving BS is greater than or equal to a first predefined threshold. The first predefined threshold is the minimum difference that should exist between qualities of signals provided to the MS by the target BS and the serving BS to initiate the handover for the MS to the target BS. A network administrator may vary the first predefined threshold depending on requirements of wireless communication network 100. For example, a difference between a RSSI value associated with the signal received by MS 120 from a BS 106, and a RSSI value associated with the signal received by MS 120 from the serving BS, i.e., BS104, is compared with the first predefined threshold to identify whether BS 106 is a suitable target BS to handover MS 120. A process of identifying the target BS is further explained in detail in conjunction with FIGS. 3A and 3B. Comparison with the first predefined threshold avoids frequent handover of the MS from the serving BS to a target BS, thus, reducing the ping-pong effect.

The quality of the signal received by the MS from the serving BS may be frequently monitored. During the monitoring process, the quality of the signal received by the MS from the serving BS may be identified as greater than the second predefined threshold. The second predefined threshold is the minimum quality of a signal to be received by the MS from the serving BS to maintain a communication link between the MS and the serving BS. The second predefined threshold value may be varied based on requirements of wireless communication network 100 by a network administrator. Accordingly, at step 204, the MS is handed over to the target BS, when the quality of the signal received by the MS from the serving BS is greater than the second predefined threshold.

Figure 3A:
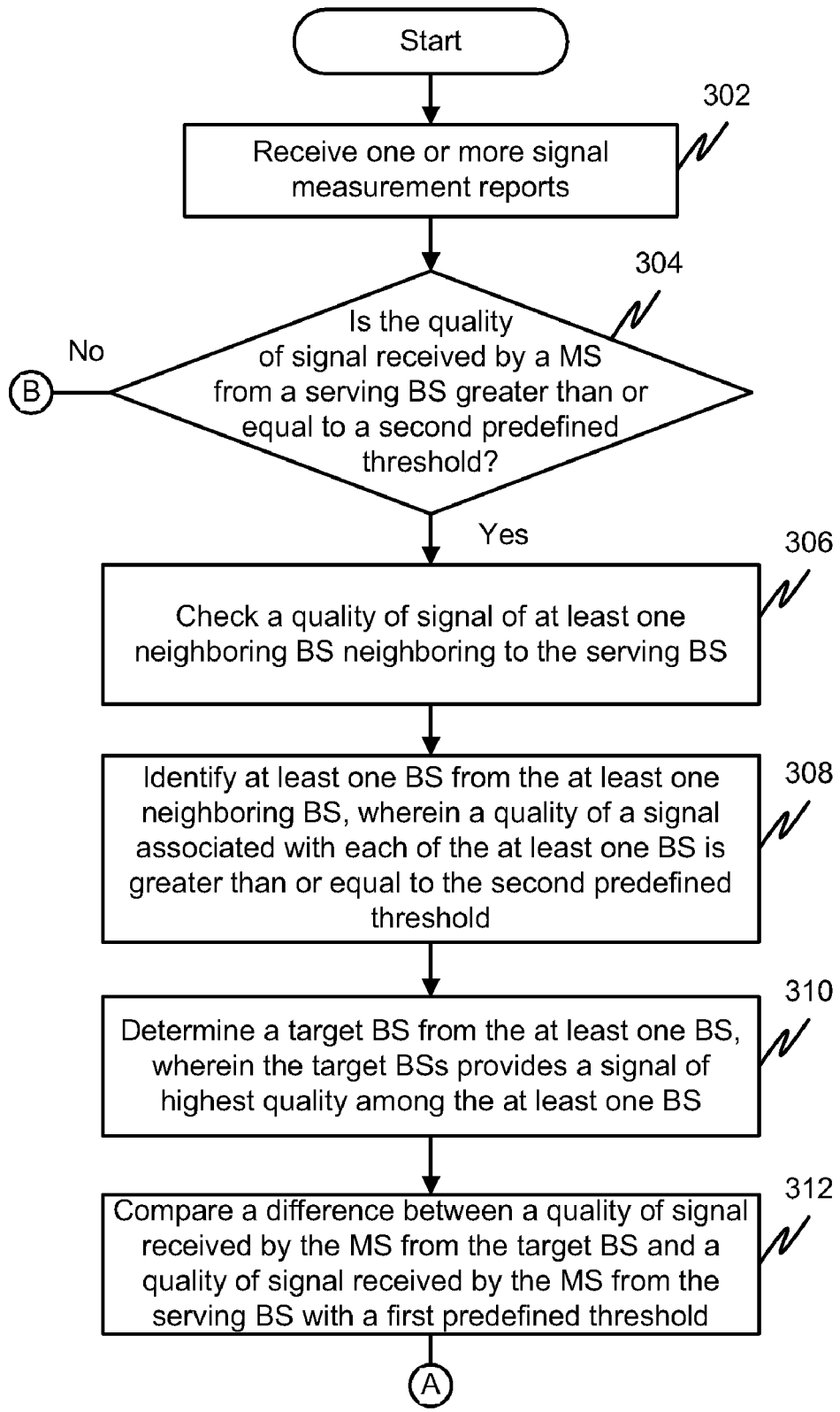
FIGS. 3A and 3B illustrate a flow diagram of a method for performing a handover in a wireless communication network, in accordance with another embodiment of the invention.
Figure 3B:
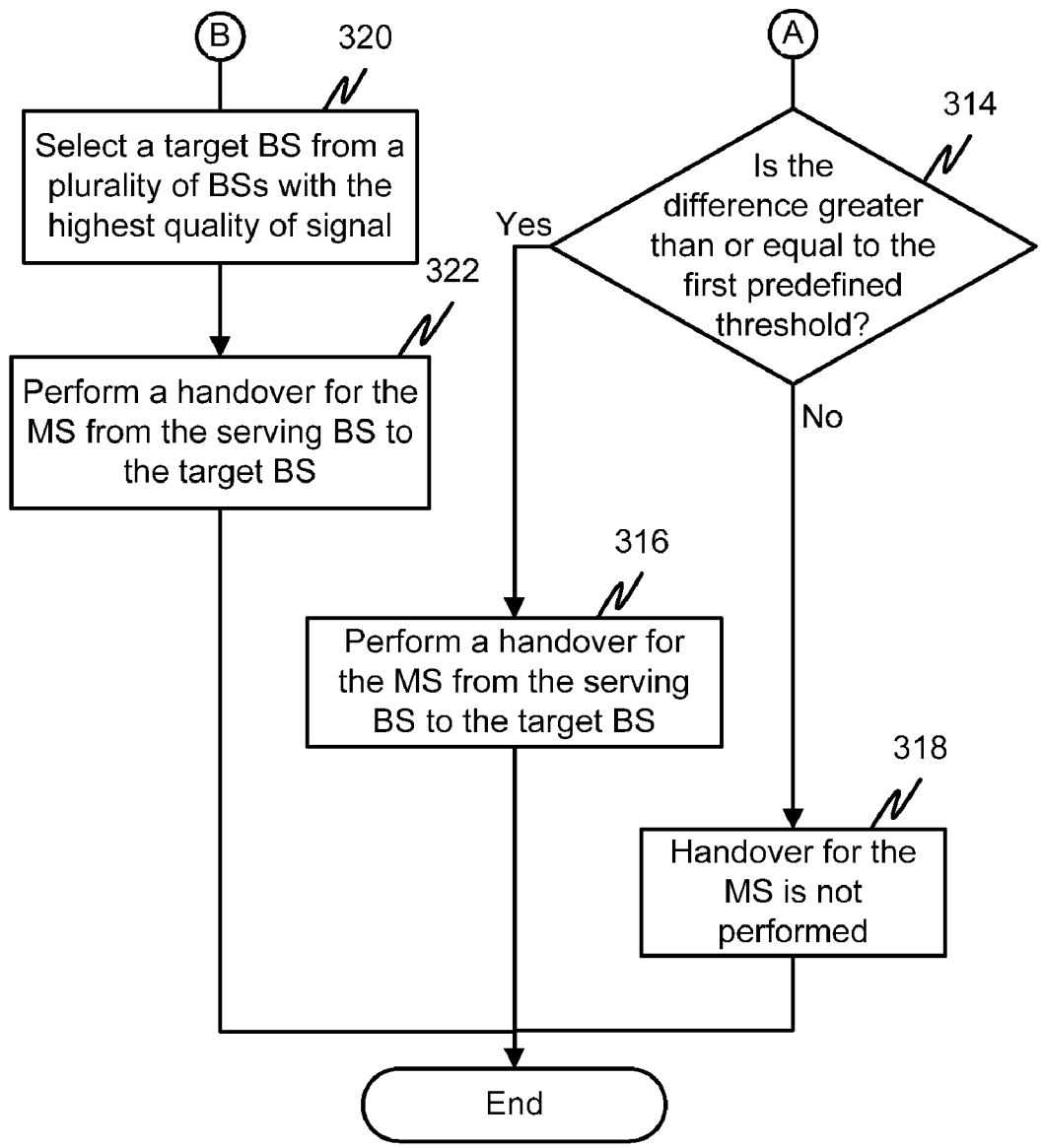

FIGS. 3A and 3B illustrate a flow diagram of a method for performing a handover in wireless communication network 100, in accordance with another embodiment of the invention. At step 302, one or more signal measurement reports are received by one or more of a serving BS and a gateway communicating with the serving BS. A signal measurement report of the one or more signal measurement reports includes one of a quality of a signal received by the MS from the one or more neighboring BSs of the plurality of BSs and a quality of signal received by the MS from the serving BS. The one or more signal measurement reports may be received periodically. Alternatively, the one or more signal measurement report may be received in response to a request generated by one or more of the serving BS and the gateway.

A signal measurement report of the one or more signal measurement reports that includes a quality of a signal associated with the serving BS is analyzed to determine the quality of the signal received by the MS from the serving BS. Further, signal measurements in the signal measurement reports may be filtered to reduce a noise level in the signal if present. Thereafter, at step 304, a check is performed to determine if the quality of the signal received by the MS from the serving BS is greater than or equal to a second predefined threshold. The second predefined threshold has been explained in conjunction with FIG. 2.

If the quality of the signal received by the MS from the serving BS is greater than or equal to the second predefined threshold, at step 306, a quality of a signal associated with one or more neighboring BSs collocated with the serving BS is checked. The plurality of BSs includes the one or more neighboring BSs. The neighboring BSs are explained in detail in conjunction with FIG. 1.

Thereafter, one or more BSs are identified from the one or more neighboring BSs at step 308. A quality of a signal associated with each of the one or more BSs is greater than or equal to the second predefined threshold. Then a target BS is determined from the one or more BSs at step 310. A quality of a signal received by the MS from the target BS is the highest quality among a quality of signals received by the MS from each of the one or more BSs.

Once the target BS is identified, a difference between the quality of the signal received by the MS from the target BS and the quality of the signal received by the MS from the serving BS is compared with the first predefined threshold at step 312. Thereafter, based on the comparison a check is performed to determine if the difference is greater than or equal to the first predefined threshold at step 314. When the difference is greater than or equal to the first predefined threshold, a handover for the MS from the serving BS to the target BS is performed at step 316. The value of the first predefined threshold may be set high, thereby facilitating selection of a target BS which provides a signal that has relatively higher quality as compared to the quality of the signal provided by the serving BS.

Referring back to step 314, when the difference is less than the first predefined threshold, a handover for the MS is not performed at step 318, as the target BS is identified unsuitable for handover of the MS. This facilitates in reducing frequent handover for the MS from the serving BS to a target BS thereby reducing the ping-pong effect and avoiding unnecessary computation load on the wireless communication network.

Referring back to the step 304, when the quality of the signal received by the MS from the serving BS is less than the second predefined threshold, a target BS that provides a signal of highest quality among the one or more neighboring BSs is identified at step 320. Thereafter, a handover for the MS is performed from the serving BS to the target BS at step 322. It will be apparent to a person skilled in the art that the target BS may be identified by using any other handover algorithm known in the art.

As an example of the method given above, apart from receiving a signal from BS 104, MS 120 also receives signals from one or more neighboring BSs, i.e., BS 106, BS 108, and BS 110. MS 120 periodically measures a quality of a signal received from BS 104 and a quality of a signal received from each of BS 106, BS 108, and BS 110. Based on these measurements, MS 120 identifies that the quality of the signal received from BS 104 is greater than a second predefined threshold value. Further, MS 120 also identifies that among BS 106, BS 108, and BS 110, quality of signals received from BS 106 and BS 108 is greater than the second predefined threshold. Moreover, BS 106 provides a higher quality of a signal as compared to BS 108. Therefore, a difference between the quality of the signal received from BS 106 and the quality of the signal received by from BS 104 is compared with a first predefined threshold. If the difference is greater than or equal to the first predefined threshold, MS 120 is handed over to BS 106 from BS 104. However, if the difference is less than the first predefined threshold, handover for MS 120 is not performed.

Figure 4:
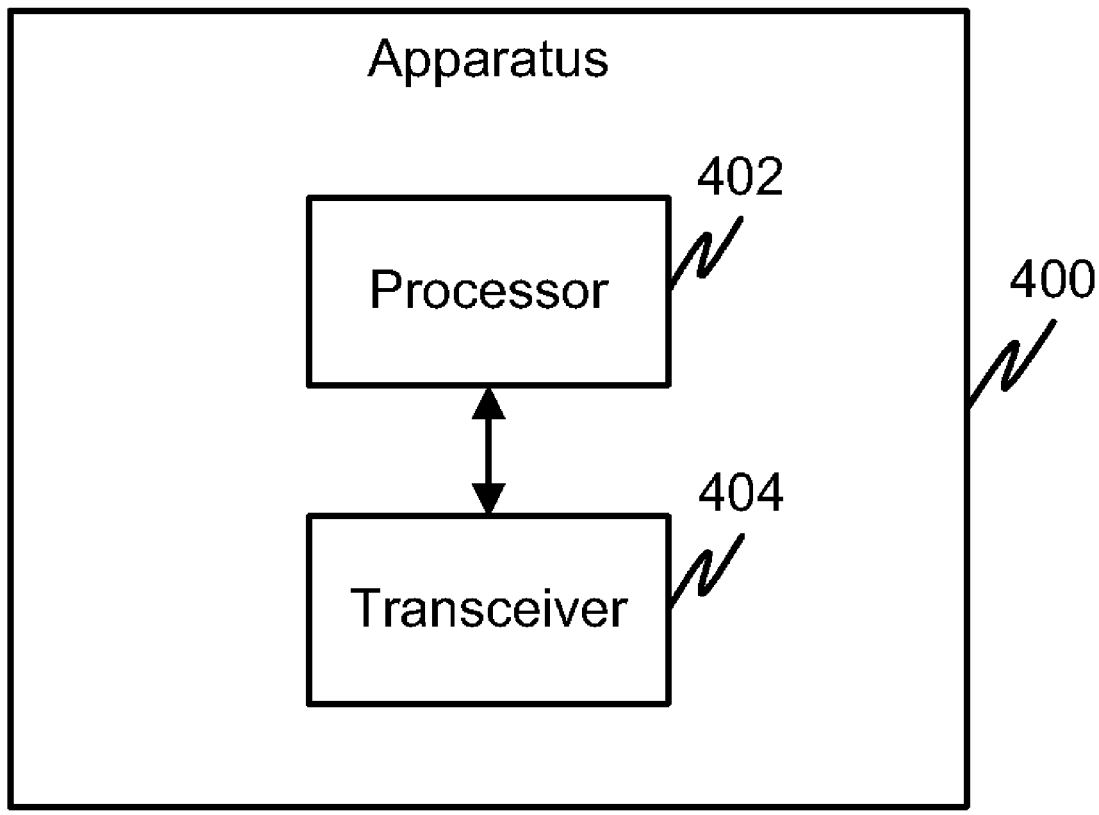
FIG. 4 illustrates a block diagram of an apparatus for performing a handover in a wireless communication network, in accordance with an embodiment of the invention.

FIG. 4 illustrates a block diagram of an apparatus 400 for performing a handover in wireless communication network 100, in accordance with an embodiment of the invention. Apparatus 400 includes a processor 402 and a transceiver 404. Apparatus 400 may be one of a BS of a plurality of BSs, a MS of a plurality of MSs, and a gateway. Transceiver 404 receives one or more signal measurement reports. The one or more signal measurement reports have been explained in detail in conjunction with FIGS. 3A and 3B.

Apparatus 400 may be a serving BS selected from the plurality of BSs. In this case, transceiver 404 may receive the one or more signal measurement reports from a MS served by the serving BS. Alternatively, apparatus 400 may be a gateway. In this case, transceiver 404 may receive the one or more signal measurement reports from the serving BS served by the gateway. The serving BS may receive the one or more signal measurement reports from the MS served by the serving BS. Alternatively, apparatus 400 may be a MS. In this case, transceiver 404 may receive signals from each BS of the plurality of BSs and may analyze quality of the signals received. Further, these signals received by the MS may be filtered using a filter to remove a noise level or other disturbances present in the signals.

Processor 402 receives and analyzes the one or more signal measurements reports. Processor 402 checks whether a quality of a signal received by the MS from the serving BS is greater than or equal to a second predefined threshold as explained in detail in conjunction with FIGS. 3A and 3B. If the quality of the signal received by the MS from the serving BS is greater than or equal to the second predefined threshold, a quality of a signal associated with one or more neighboring BSs collocated with the serving BS is checked by processor 402. The plurality of BSs includes the one or more neighboring BSs. Thereafter, processor 402 identifies the one or more BS from the one or more neighboring BSs. A quality of a signal associated with each of the one or more BSs is greater than or equal to the second predefined threshold.

Processor 402 then determines a target BS from the one or more BSs. A quality of a signal received by the MS from the target BS is the highest quality among quality of signals received by the MS from each of the one or more BSs. Thereafter, processor 402 compares a difference between the quality of the signal received by the MS from the target BS and the quality of the signal received by the MS from the serving BS with the first predefined threshold. Based on the comparison, processor 402 determines whether the target BS is suitable for handing over the MS from the serving BS. This has been explained in detail in conjunction with FIGS. 3A and 3B.

If the target BS is identified as the suitable BS, processor 402 may determine an identifier associated with the target BS. The identifier may be a unique identity assigned to the target BS by the network administrator. The identifier enables processor 402 to locate the target BS from the plurality of BSs. It will be apparent to a person skilled in the art that each BS of the plurality of BSs may have a unique identifier. Thereafter, processor 402 may perform a handover for the MS from the serving BS to the target BS. Processor 402 may use the identifier to locate the target BS for performing the handover for the MS.

Various embodiments of the invention provide methods and apparatus for handover for a MS of the plurality of MSs to a BS of the plurality of BSs in a wireless communication network. A MS is handed over to a target BS only if a difference between a quality of a signal received by the MS from the target BS and a quality of a signal received by the MS from the serving BS is greater than or equal to a threshold value. This reduces frequent handover of a MS between multiple BSs. As a result, unnecessary computation load on the wireless communication network to manage frequent handovers of the MS is avoided. Additionally, a BS capable of providing a better quality of a signal to the MS is identified even if the quality of the signal received by the MS from the serving BS is sufficient, thereby providing enhanced services to a user of the MS.

Those skilled in the art will realize that the above-recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of communication in a wireless communication network, the method comprising:
    identifying a target Base Station (BS) from among a plurality of BSs for handover of a Mobile Station (MS) served by a serving BS in response to a difference between a quality of a signal received by the MS from the target BS and a quality of a signal received by the MS from the serving BS;
    selecting the target BS for handover in an event the difference between the quality of signals is greater than or equal to a first predefined threshold; and
    performing a handover of the MS from the serving BS to the selected target BS in an event the quality of the signal received by the MS from the serving BS is greater than or equal to a second predefined threshold, the second predetermined threshold being the minimum quality of the signal received by the MS from the serving BS to maintain a communication link between the MS and the serving BS.

2. The method of claim 1, wherein identifying the target BS from among the plurality of BSs further includes:
    checking a quality of a signal of at least one neighboring BS of the serving BS, wherein the plurality of BSs comprises the at least one neighboring BS; and
    identifying at least one BS from the at least one neighboring BS, wherein a quality of a signal associated with each of the at least one BS is greater than or equal to the second predefined threshold.

3. The method of claim 2, wherein identifying the target BS further comprises determining the target BS from the at least one BS, wherein the target BSs provides a signal of highest quality among the at least one BS.

4. The method of claim 3, wherein identifying the target BS further comprises comparing a difference between the quality of the signal received by the MS from the target BS and the quality of the signal received by the MS from the serving BS with the first predefined threshold.

5. The method of claim 1, further comprising receiving a signal measurement report, wherein the signal measurement report includes one of the following: the quality of the signal received by the MS from the target BS or the quality of the signal received by the MS from the serving BS.

6. The method of claim 5, wherein the quality of the signal is one of a Received Signal Strength Indication (RSSI), a Signal to Noise Ratio (SNR), a Signal to Noise Interference Ratio (SNIR), and a Channel to Noise Interference Ratio (CNIR).

7. The method of claim 1, wherein the wireless communication network is one of the following: a Worldwide Interoperability for Microwave Access (WiMAX) communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (Wi-Fi) network, and an Orthogonal Frequency Division Multiple Access (OFDMA) communication network.

8. An apparatus for communication in the wireless communication network, the apparatus comprising:
    a processor configured to:
        identify a target Base Station (BS) from among a plurality of BSs for handover of a Mobile Station (MS) served by a serving BS in response to a difference between a quality of a signal received by the MS from the target BS and a quality of a signal received by the MS from the serving BS select the target BS for handover in an event the difference between the quality of signals is greater than or equal to a first predefined threshold; and
        perform a handover of the MS from the serving BS to the selected target BS in an event the quality of the signal received by the MS from the serving BS is greater than or equal to a second predefined threshold, the second predetermined threshold being the minimum quality of the signal received by the MS from the serving BS to maintain a communication link between the MS and the serving BS.

9. The apparatus of the claim 8, wherein the apparatus is the serving BS.

10. The apparatus of the claim 8, wherein the apparatus is a gateway communicating with the serving BS.

11. The apparatus of the claim 8, wherein the apparatus is the MS.

12. The apparatus of claim 8, wherein the processor is further configured to:
    check a quality of a signal associated with at least one neighboring BS neighboring to the serving BS; and
    identify at least one BS from the at least one neighboring BS, wherein a quality of a signal associated with each of the at least one BS is greater than or equal to the second predefined threshold.

13. The apparatus of claim 8, wherein the target BS is determined from the at least one BS and provides a signal of highest quality among the at least one BS.

14. The apparatus of claim 8, wherein the processor is further configured to compare a difference between the quality of the signal received by the MS from the target BS and the quality of the signal received by the MS from the serving BS with the first predefined threshold.

15. The apparatus of claim 8 further comprising:
    a transceiver configured to receive a signal measurement report, wherein the signal measurement report comprises one of a quality of a signal received by the MS from at least one BS of the plurality of BSs, the quality of the signal received by the MS from the target BS, and the quality of the signal received by the MS from the serving BS.

16. The method of claim 1 wherein the first predefined threshold is a minimum threshold between qualities of signals provided to the MS by the target BS and the serving BS to initiate the handover.

17. The method of claim 1 wherein the second predefined threshold is a minimum quality of signal received by the MS from the serving BS necessary to maintain a communication link.

18. The method of claim 5 wherein the signal measurement report is received periodically or in response to a request.

19. The apparatus of claim 15 wherein the transceiver is further configured to filter the signal measurements to reduce a noise level in the signal.

* * * * *